US008595245B2

(12) United States Patent
Cavestro et al.

(10) Patent No.: US 8,595,245 B2
(45) Date of Patent: Nov. 26, 2013

(54) REFERENCE RESOLUTION FOR TEXT ENRICHMENT AND NORMALIZATION IN MINING MIXED DATA (75) Inventors: Bruno Cavestro, Grenoble (FR); Jean-Michel Renders, Saint-Nazaire-les-Eymes (FR)

(73) Assignee: Xerox Corporation, Norwalk, CT (US)

( * ) Notice: Subject to any disclaimer, the term of this patent is extended or adjusted under 35 U.S.C. 154(b) by 289 days.

(21) Appl. No.: 11/493,085

(22) Filed: Jul. 26, 2006

(65) Prior Publication Data
US 2008/0027893 A1 Jan. 31, 2008

(51) Int. Cl.
G06F 7/00 (2006.01)
G06F 17/30 (2006.01)
G06F 17/00 (2006.01)

(52) U.S. Cl.
USPC .......................................... 707/758; 715/231

(58) Field of Classification Search
USPC ..................... 707/749, 999.1, 758; 715/231
See application file for complete search history.

(56) References Cited

U.S. PATENT DOCUMENTS

| 5,983,248 | A | * | 11/1999 | DeRose et al. ............... 715/234 |
| 6,006,242 | A | * | 12/1999 | Poole et al. ................... 715/209 |
| 6,101,511 | A | * | 8/2000 | DeRose et al. ............... 715/234 |
| 6,101,512 | A | * | 8/2000 | DeRose et al. ............... 715/234 |
| 6,105,044 | A | * | 8/2000 | DeRose et al. ............... 715/234 |
| 6,862,585 | B2 | * | 3/2005 | Planalp et al. ..................... 1/1 |
| 7,047,242 | B1 | * | 5/2006 | Ponte ................................. 1/1 |
| 7,266,537 | B2 | * | 9/2007 | Jacobsen et al. .............. 706/62 |
| 7,333,966 | B2 | * | 2/2008 | Dozier ............................ 706/21 |
| 7,548,933 | B2 | * | 6/2009 | Krishnamurthy et al. ........... 1/1 |
| 7,571,174 | B2 | * | 8/2009 | Arumainayagam et al. ......... 1/1 |
| 7,734,556 | B2 | * | 6/2010 | Tan et al. ........................ 706/45 |
| 7,739,277 | B2 | * | 6/2010 | Meyerzon et al. ............. 707/726 |
| 7,987,088 | B2 | * | 7/2011 | Moitra et al. .................. 704/10 |
| 2002/0087573 | A1 | * | 7/2002 | Reuning et al. ............... 707/102 |
| 2002/0143726 | A1 | * | 10/2002 | Planalp et al. .................... 707/1 |
| 2003/0149586 | A1 | * | 8/2003 | Chen et al. ........................ 705/1 |

(Continued)

FOREIGN PATENT DOCUMENTS

JP 2006-72844 3/2006

OTHER PUBLICATIONS

A.Kiryakov, B.Popov, I.Terziev, D.Manov, D.Ognyanoff, Semantic Annotation, Indexing, and Retrieval, *Web Semantics: Science, Services, and Agents on the World Wide Web*, vol. 2, No. 1, pp. 54-60, Dec. 2004.

N.Boufaden, An Ontology-Based Semantic Tagger For IE System, *In Proc. of the 41st Annual Meeting On Association For Computational Linguistics*, vol. 2, pp. 7-14, 2003.

(Continued)

*Primary Examiner* — Jacob F Bétit
*Assistant Examiner* — Griselle Corbo
(74) *Attorney, Agent, or Firm* — Fay Sharpe LLP (57) ABSTRACT A method for enrichment of text which enables mixed data mining includes generating a model for structured data found in tables of a database. In the model, semantically-linked terms are associated with referents, such as field names or cell content of the fields, of the structured data. The referents may be a business object or refer to a business object. A plurality of candidate referring entities in textual data in the database, such as chunks of free text, is identified. For each candidate referring entity, a similarity measure between the candidate referring entity in the textual data and the model is computed to identify referring entities of the candidate referring entities and corresponding business objects/referents to which the referring entities refer. The textual data is enriched with information derived from the business objects.

22 Claims, 6 Drawing Sheets

(56) References Cited

U.S. PATENT DOCUMENTS

| | | | |
|---|---|---|---|
| 2004/0049498 A1* | 3/2004 | Dehlinger et al. | 707/3 |
| 2004/0064438 A1* | 4/2004 | Kostoff | 707/1 |
| 2005/0108001 A1* | 5/2005 | Aarskog | 704/10 |
| 2005/0120011 A1* | 6/2005 | Dehlinger et al. | 707/3 |
| 2005/0154692 A1* | 7/2005 | Jacobsen et al. | 706/47 |
| 2005/0198026 A1* | 9/2005 | Dehlinger et al. | 707/5 |
| 2005/0228790 A1* | 10/2005 | Ronnewinkel et al. | 707/6 |
| 2005/0229150 A1* | 10/2005 | Ronnewinkel | 717/101 |
| 2005/0246333 A1* | 11/2005 | Hou et al. | 707/5 |
| 2006/0069982 A1* | 3/2006 | Petriuc | 715/500 |
| 2006/0074871 A1* | 4/2006 | Meyerzon et al. | 707/3 |
| 2006/0085414 A1* | 4/2006 | Chai et al. | 707/5 |
| 2006/0122974 A1* | 6/2006 | Perisic | 707/3 |
| 2006/0200453 A1* | 9/2006 | Santrosyan et al. | 707/3 |
| 2006/0247914 A1* | 11/2006 | Brener et al. | 704/1 |
| 2006/0248049 A1* | 11/2006 | Cao et al. | 707/3 |
| 2006/0282442 A1* | 12/2006 | Lennon et al. | 707/100 |
| 2007/0067285 A1* | 3/2007 | Blume et al. | 707/5 |
| 2007/0088734 A1* | 4/2007 | Krishnamurthy et al. | 707/102 |
| 2007/0100823 A1* | 5/2007 | Inmon | 707/6 |
| 2007/0118803 A1* | 5/2007 | Walker et al. | 715/744 |
| 2007/0208758 A1* | 9/2007 | Yeap et al. | 707/100 |
| 2007/0255704 A1* | 11/2007 | Baek et al. | 707/6 |
| 2007/0271107 A1* | 11/2007 | Fiedler et al. | 705/1 |
| 2008/0021924 A1* | 1/2008 | Hall et al. | 707/103 X |
| 2008/0126399 A1* | 5/2008 | MacGregor | 707/102 |
| 2008/0301074 A1* | 12/2008 | Dozier | 706/21 |
| 2009/0326919 A1* | 12/2009 | Bean | 704/9 |
| 2012/0117120 A1* | 5/2012 | Jacobson et al. | 707/793 |

OTHER PUBLICATIONS

V.T.Chakaravarthy, H.Gupta, P.Roy, M.Mohania, Efficiently Linking Text Documents With Relevant Structured Information, *In Proc. of the 32$^{nd}$ International Conference on Very Large Data Bases*, pp. 667-678, Sep. 2006.

S.Dill, N.Eiron, D.Gibson, D.Gruhl, et al., SemTag And Seeker: Bootstrapping The Semantic Web Via Automated Semantic Annotation, *In Proc. of the 12$^{th}$ International Conference on World Wide Web*, pp. 178-186, 2003.

E.Motta, S.Buckingham Shum, J.Domingue, Ontology-Driven Document Enrichment: Principles, Tools, and Applications, *International Journal of Human-Computers Studies*, vol. 52, No. 6, pp. 1-41, 2000.

Mike Meyer, *Better Predictions Using Unstructured Data In Mixed-Data Modeling*, DM Direct, www.dmreview.com/dmdirect/, Jul. 2004.

Guy Creese, *Duo Mining: Combining Data and Text Mining*, DM Review, www.dmreview.com, Sep. 2004.

Daniel Abadi, *Comparing Domain-Specific and Non-Domain Specific Anaphora Resolution Techniques*, PhD Dissertation, Churchill College, Jul. 2003.

Andrei Popescu-Belis, Denis Lalanne, *Resolution Over a Restricted Domain: References to Documents*, 2004.

Zunaid Kazi, Yael Ravin, *Who's Who? Identifying Concepts and Entities Across Multiple Documents*, 33$^{rd}$ Hawaii International Conference on System Sciences, 2000.

Kato, et al. "Paradocs: A database system for managing structured documents with object links—the model and the Queries", Technical Report of IBICE (DE98-1 to 9), The Institute of Electronics Information and Communication Engineers, 1998, vol. 98, No. 42, pp. 23-30.

* cited by examiner

REFERENCE RESOLUTION FOR TEXT ENRICHMENT AND NORMALIZATION IN MINING MIXED DATA

BACKGROUND

The exemplary embodiment relates to the management and use of documents. It finds particular application in connection with the enrichment of data with information which allows both structured and unstructured (textual) data to be analyzed with common forms of analysis.

Frequently, business data sources contain structured as well as non-structured data. Structured data may include quantitative information about business objects, while the non-structured data may include textual information related to these business objects. Examples of structured data include tables in which defined hierarchical relationships exist between different parts of the data. For example, a table of a database generally includes fields corresponding to the column headings in a conventional table, which have a predefined relationship to the content of each column. Unstructured data is textual data which is expressed in a natural language ("free text") and may include text which results from interactions with customers or suppliers, such as e-mails, scanned and OCR-ed (automated character recognition processed) mail, survey questionnaires, transcripts of phone calls, notes of meetings, and so forth in which no such structure exists (or is at best, very limited). For example, technical centers often maintain databases of fault/repair logs, containing both structured information about the hardware, the product components, date of intervention, involved technicians, as well as verbatim comments.

Generally, the two parts of the mixed-data environment are kept isolated and are utilized separately. In analysis of the data, reports and statistical analysis rely only on the quantitative (structured) part using data mining techniques, while the textual part is often exploited by traditional Information Retrieval engines using keyword searching techniques. There is no real link made with the quantitative part of the data.

Users of the data have an interest in mixed data modeling for a variety of uses. One reason for the lack of a global analysis/exploitation of the data is that the unstructured text uses different expressions to refer to the business objects and may refer to them generically.

For example, a customer may e-mail a service engineer at AB Company about a malfunction on his printer model AB100 indicating simply: "my new printer is not working." The service engineer is able to determine the printer model from records in the structured business data. For example the database may include tables which list all the engineer's customers, the corresponding printer models, and when they were purchased. The engineer is then able to respond to the customer's e-mail and may store the e-mail in a database file of customer service requests. However, AB Company may wish to generate a report of the number of service calls for each of its printer models. Although this information may exist in the company's database as a whole, the company has no way of extracting the information in an automated fashion from both the structured and unstructured (textual) data.

One solution is to re-structure the textual free part by reducing it to a list of controlled keywords, with entity extraction, classification, and clustering techniques. Once re-structured under the form of extra features whose values belong to finite, known sets, the textual part can then be integrated in the structured part of the database and standard methods can then be applied for analytic purposes. This can be a lengthy process which is operator intensive.

INCORPORATION BY REFERENCE

Andrei Popescu-Belis and Denis Lalanne, "Reference Resolution over a Restricted Domain: References to Documents," 2004, discusses the manual annotation of references made by speakers at a meeting to documents stored in a database.

Zunaid Kazi and Yael Ravin, "Who's who? Identifying concepts and entities across multiple documents," Proc. 33rd Hawaii International Conference on System Sciences, 2000, describes detection of different variants of the same person name across multiple documents.

Daniel Abadi, "Comparing Domain-Specific and Non-domain-specific Anaphora Resolution Techniques," PhD Dissertation, Churchill College, July, 2003, describes techniques for resolving pronominal anaphora resolution within e-mails received from customers by giving more weight to co-reference terms in the e-mail which constitute business oriented concepts on the basis that the e-mail writers are aware that the person responding to the e-mail will use a data source to respond to the e-mail.

BRIEF DESCRIPTION

According to aspects illustrated herein, there is provided a method for enrichment of text. The method includes generating a model for structured data in a database, the generation of the model including associating referents in the database with designating terms which each describe an object, the referents each comprising or referring to one of the objects. Candidate referring entities are identified in the textual data in the database. For each candidate referring entity, a similarity measure is computed including comparing the candidate referring entity in the textual data with the model to identify referring entities of the candidate referring entities and corresponding objects to which the referring entities refer. The textual data is enriched with information derived from the corresponding objects.

In another aspect, a system includes a database including a plurality of records stored in memory. Each of the plurality of records includes structured data arranged in fields of structured data and textual data in fields of textual data. At least some of the fields of structured data include referents which refer to business objects. A processor annotates the textual data with annotations which identify business objects referred to by the referents of the structured data by computing a similarity measure between textual chunks of the textual data and a business model associated with the structured data.

In another aspect, a method includes associating designating terms with referents in fields of a database table comprising a plurality of records for which the fields include structured data, the referents each comprising or referring to a business object. Candidate referring entities are identified in portions of textual data, the portions of textual data being in textual data fields of the database table or linked thereto whereby each textual data portion is associated with fewer than all of the records in the table. For each of a plurality of candidate referring entities, a similarity measure is computed between the candidate referring entity and the designating terms associated with the referents of the same record of the database table. Where the computed similarity measure exceeds a threshold, the textual data portion of the record is enriched with information derived from the business object for the referent.

DETAILED DESCRIPTION

Aspects of the exemplary embodiment relate to a method for enriching structured and/or unstructured data in a database which permits subsequent analysis of the data using common information analysis techniques. In various aspects, the method includes developing a model in which designating terms are associated with referents in structured data, the referents each comprising or referring to a business object, and identifying, optionally following expanding, of candidate referring entities in a textual part of the database. The method further includes computing a similarity measure between the candidate referring entities and the model to identify referring entities and the business objects to which they refer. The method further includes enriching the textual data with information derived from the business objects.

The system and method find application in fault/diagnosis/repair log databases, customer e-mail routing, and data-mining in general. By way of example, the method is described herein in terms of business scenarios. However, it is to be appreciated that system and method find application in a variety of contexts. The method allows entity extraction, classification, and clustering methods to be more efficient by working on a more complete disambiguation, and normalized textual information. This, in turn, allows a more precise restructuring and integration of the unstructured part of the data into a global, completely structured database for further analytical purposes.

An example of a specific situation in which the system may be employed is in the linking of consumer satisfaction surveys to structured information on the products which are the subject of the surveys. Another example is in linking e-mail or other correspondence related to servicing or sales with information on the products sold to particular customers.

As used herein, an "object" is a concept which constitutes an item of interest in a predefined, domain-specific, finite set of such concepts.

An object may include other objects since objects can be classed according to their common role or function, and these roles or functions can be structured hierachically. In the business domain, objects are referred to as business objects. A business object can be any physical or logical object of significance to a business; for example, a specific product, a set of products, an employee, a group of customers representing a market segment, sales order, department, assembly, item, balance, or invoice. Business objects are typically organized in hierarchical classes at the abstract or physical level. A business object may be analogous to a member of a class or instance of a class in object-oriented terminology. Each business object can comprise, for example, an entity name and an abstraction, which can be a role or function. A role is generally associated with a person name while a function is associated with an inanimate object, such as a product, or a service.

The database includes tables in which data fields, corresponding to the columns, have a logical, hierarchical relationship with content of the structured data. The data fields generally refer to objects, which in a business environment are business objects. The "rows" of a table in the database constitute the records. A record is a collection of related information about one business object, such as a customer, stored in a database table. Each record may include or refer to other business objects, such as the printers purchased, or the technician servicing them. However, each record is associated with only a limited number of the business objects (a subset of all the possible business objects). Each field may be associated in the database with field information, such as a field name and/or a field description, corresponding to a column header in a conventional table. The field name may be part of the mandatory information in the database for identifying the field and may comprise a short character string. The field description, where present, may be part of the meta-data of the table. The field description may provide more information about the semantics of the content of the field and can be one or more sentences.

As will be appreciated, the concept of rows and columns is arbitrary when discussing a database table and is used here only for illustration. Structured data in the cells of the table may include, for example, demographic, geographical, and/or transactional data. In general, records in the structured part of database comprise ordered arrangements which define relationships between two or more objects. Typical structured information in the database may include a table of employees, a table of products and their functions, and so forth. The entity relations (E-R) schema of the tables in a database typically encodes the class structure of the business objects.

Some of the database fields include unstructured data or a link to unstructured data. Specifically, records in the database may include one or more text fields, each of which comprises natural language text. Or, fields may include a link which provides access to the text. The links may be made via a join table. Thus, for a given record, one or more of the fields may include one or more links to the corresponding unstructured data. A record may thus include both structured and unstructured data. Those fields which identify records in a different table are referred to as foreign keys.

Unstructured data, as noted above, comprises textual data and may include portions of textual data in the form of reports of communications, such as e-mails, scanned and OCR-ed mail, survey questionnaires, transcripts of phone calls, and the like expressed in one or more natural languages, such as English. In general unstructured data lacks a defined, hierarchical structure. Unstructured data is sometimes referred to as free texts or verbatim texts. Although described as unstructured data, the text comprising the unstructured data is linked to the structured data and thus is contained within the overall structure of the database. The format metadata of the table generally distinguishes each field as comprising either structured data or free text. The data in the database may also include data which is unsearchable with the techniques described herein (e.g., keyword searching), such as image data, audio data, or video data, which is not considered here.

"Referents" as used herein, are those parts of the structured part of the database which are a business object or refer (e.g., by use of a code or shortened form) to a business object, such a particular printer or a physical person, such as John Doe.

A "referring entity," as used herein, is an expression in the unstructured part of the database which refers to the structured part of the database. Referring entities can be terms (single word or multiple words) in the unstructured (textual) part of the database and can refer to either referents in other fields of the same record of the table, or to referents of another record of linked tables. In the exemplary embodiment, a referring entity is considered to refer to a referent when a computed similarity measure between the referring entity (or a normalized form thereof) and the referent exceeds a selected threshold value.

By "referring," it is meant that referring entity and the business object are in a semantic relationship. Semantic relationships may include synonymy, hypernymy/hyponymy, and holonymy/meronymy. These are all grammatical morphemes that refer to relationships between word pairs. Synonyms are different words which have similar or identical meanings. Hypernyms are words whose meaning includes the meanings of other words, as the meaning of transportation includes the meaning of train, airplane, and automobile. Hypernyms are the opposite of hyponyms. Another name for a hypernym is a superordinate. A hyponym is a word that that is conceptually included within the definition of another word, as scarlet, vermilion, carmine and crimson are all hyponyms of red. Holonyms are one of the words of the word pair holonym and meronym. A holonym is thus a word for the whole and of which other words are part, in the way printer contains fuser, photoreceptor, and output trays; or car comprises steering-wheel and engine.

"Enrich" is used herein generally to mean to annotate a free text entry in the database with information in accordance with its association with an object or referent. The annotation may create a reference between a referring entity in a record, or region of a record and a business object or referent. Additionally, referents may be enriched with information about the corresponding business object to which they refer. Enrichment, as used herein, may include replacement, as in the replacement of a textual chunk with a normalized form thereof.

A "lexicon" as used herein can encompass one or more of a data structure, program, object, or device that indicates a set of words that may occur in a natural language set, such as a dictionary, thesaurus, or specific database of words. An exemplary lexicon is an online service, such as WordNet, which provides synonymy, hypernymy/hyponymy, and holonymy/meronymy equivalents for input words.

It is assumed that each object can be identified by a unique identity (an object_id), which may be a normalized unique identifier. In one aspect of the exemplary embodiment, the references of interest belong to a domain-specific (user-defined) set of business objects (e.g., customers, products, services, employees). Typically, these objects can be formalized with an object_id as <name, role or function> pairs (e.g., <Joe Schmidt, Technician>; <Ann Doe, Sales Representative>; <TPX435, copier>). The set of roles and functions are known in advance, and they are generally strongly tied with the database structure (e.g., as a table name or a column description). This strong coupling can be exploited to define business objects in a semi-automatic manner.

It is assumed that the name in the <name, role or function> pair is a unique identifier of the object. The name (or entity name) can be, for example, the name of a product, person, or service. Several object_ids may thus have the same role or function, but no two object_ids should have the same entity name as well as the same role or function. Typically, the records in the structured portion of the database, and often the field names and/or field descriptions, include names, roles, or functions of object_ids.

To illustrate these concepts, suppose that AB company, which sells or leases copiers and provides technical services for those copiers, has a database with three tables, as follows:

TABLE 1

(Customer)

| Field 1: | Customer Id |
| Field 2: | Customer Name |
| Field 3: | Customer Segment |
| Field 4: | Technician Id |

TABLE 2

(Technician)

| Field 1: | Technician Id |
| Field 2: | Technician Name |
| Field 3: | Technician Affiliation |

TABLE 3

(Survey)

| Field 1: | Survey Id |
| Field 2: | Customer Id |
| Field 3: | Satisfaction Score [1-5] |
| Field 4: | Customer Free Comment (Free Text) |

Assume that there are 7 business objects: 4 customers (AC Co., DE Co., FR Co., and J Co.) and 2 technicians (Nadine Doe and Joe Wilson). The three tables may include the following information in the records:

TABLE 1

| 193465 | AC Co. | Office | 99012 |
| 193467 | DE Co. | Office | 99012 |
| 193405 | FR Co. | Large | 99010 |
| 190467 | J Co. | Medium | 99010 |

TABLE 2

| 348543 | Doe | MassCo |
| 348544 | Wilson | IllinoisCo |

TABLE 3

| 435 | 193467 | 4 | "I am very happy with the services of our Tech and the quality of our copier" |
| 436 | 193405 | 2 | "Your copier is a lemon!" |
| . . . etc | | | |

A join can be made of the three tables, around the customer table (Table 1). This gives a new table with the following fields:

TABLE

New

| Field 1: | Customer Id |
| Field 2: | Customer Name |
| Field 3: | Customer Segment |
| Field 4: | Technician Id |
| Field 5: | Technician Name |
| Field 6: | Technician Affiliation |
| Field 7: | Survey Id |
| Field 8: | Satisfaction Score [1-5] |
| Field 9: | Customer Free Comment (Free Text) |

The records in this table may therefore be as follows:

193467 DE Co. Office 348544 Wilson Illinois Co 435 4 "I am very happy with the services of our Tech and the quality of our copier"

193405 FR Co. Large 99010 Doe Mass Co 436 2 "Your copier is a lemon!" . . . etc

This last table, which may be created as a "view," or virtual table, may be the starting point for the exemplary method described herein. The last field in this table, which includes the customer comments (or a link thereto) is the unstructured portion of the database in this scenario.

In the exemplary embodiment, rather than relying simply on an enrichment of the unstructured data in a database, the text is enriched by detecting, solving, and normalizing references to the structured part of the database. This enhances the performance of textual information access methods by working on an enriched representation of the textual information.

One problem to be addressed in aligning structured and unstructured data is co-reference resolution. This has some relationships with co-reference resolution in Natural Language Processing. Co-reference in that context is the relation between two referring entities that refer to the same discourse entity (abstraction of the representation of the entity in the writer's mind). The exemplary embodiment aims at solving the more general case of detecting expressions (referring entities) in textual fields which could refer to business objects and enriching them with some normalized information related to these business objects. In particular, reference resolution amounts to the construction of links between a referring entity in the unstructured part of the database and a corresponding referent in the structured part of the database. The referring entities available in the textual part can be matched against the set of referents, which can be derived from the structured part of the database (structure and content). A computational representation of the referents is therefore available to serve as a discourse entity.

The database structure, and in particular, the fact that the verbatim textual part is stored as a particular value of a column in a table record, automatically offers a single context to solve the reference problem within a record and potentially some associated records through relations (links) between tables of the database. The problem is usually reduced to a many-to-one mapping between several variants and a single object.

The referring entities are enriched with the corresponding external information, for example by extending the referring entity or cell of the database to which it is linked with an object_id, (a normalized unique identifier), which can then be used to univocally point to the business object:

Depending on the intended usage of the textual data, the enrichment may be expanded from a single object_id to a more complete description, e.g., in a structured way, for example, using one or more extended markup language (XML) tags, represented here by <>, or a non-structured way, through textual expansion. The following examples are used to illustrate the enrichment of the unstructured portion of the database with object_ids.

In the case of a partial name (last name, first name) in some textual field of a record, the enrichment may include completion of this with a correct, normalized name and the corresponding role. For example, the phrase "Joe has repaired . . . " may be enriched in any of the three following ways:

1. Joe <Tech_id200943> has repaired . . . .
2. Joe (<Name> Joe Schmidt <function> Technician <area> North Carolina, . . . ) has repaired
3. Joe Schmidt, our associated technician, which is operating in North Carolina, . . . .

In the case where a role or function is mentioned, but not the name, similar enrichment may be performed by adding the name of the business object. For example, the phrase "Our sales rep has missed the point" can be enriched as:

1. Our sales rep<Rep_id3489543> has missed the point
2. Our sales rep(<Name> Nadine Doe, <function> Sales representative, <Rep_id3489543>) has missed the point
3. Nadine Doe, our Sales representative, member of the B348 unit, has missed the point With reference now to FIG. 1, a functional block diagram of an exemplary apparatus 10 for data mining includes a computer system 12 and a database 14. The computer system 12 is capable of searching the database 14 to retrieve information contained in records 16 which is responsive to a query or to perform other forms of analysis on the data. The records include information in a plurality of fields 18 (nine fields in the illustrated embodiment). Records 16 include both a structured part 20 and an unstructured part 22. In the illustrated embodiment, the last field 18 comprises the unstructured part. Information from either or both parts 20, 22 may be retrieved as responsive to a given query, depending on the query. While the illustrated table is illustrated for convenience as a regular grid with the information contained in the cells, it will be appreciated that the cells may comprise information spaced by a delimiter, such as a comma. Additionally, the field information may be incorporated in meta data.

Figure 1:
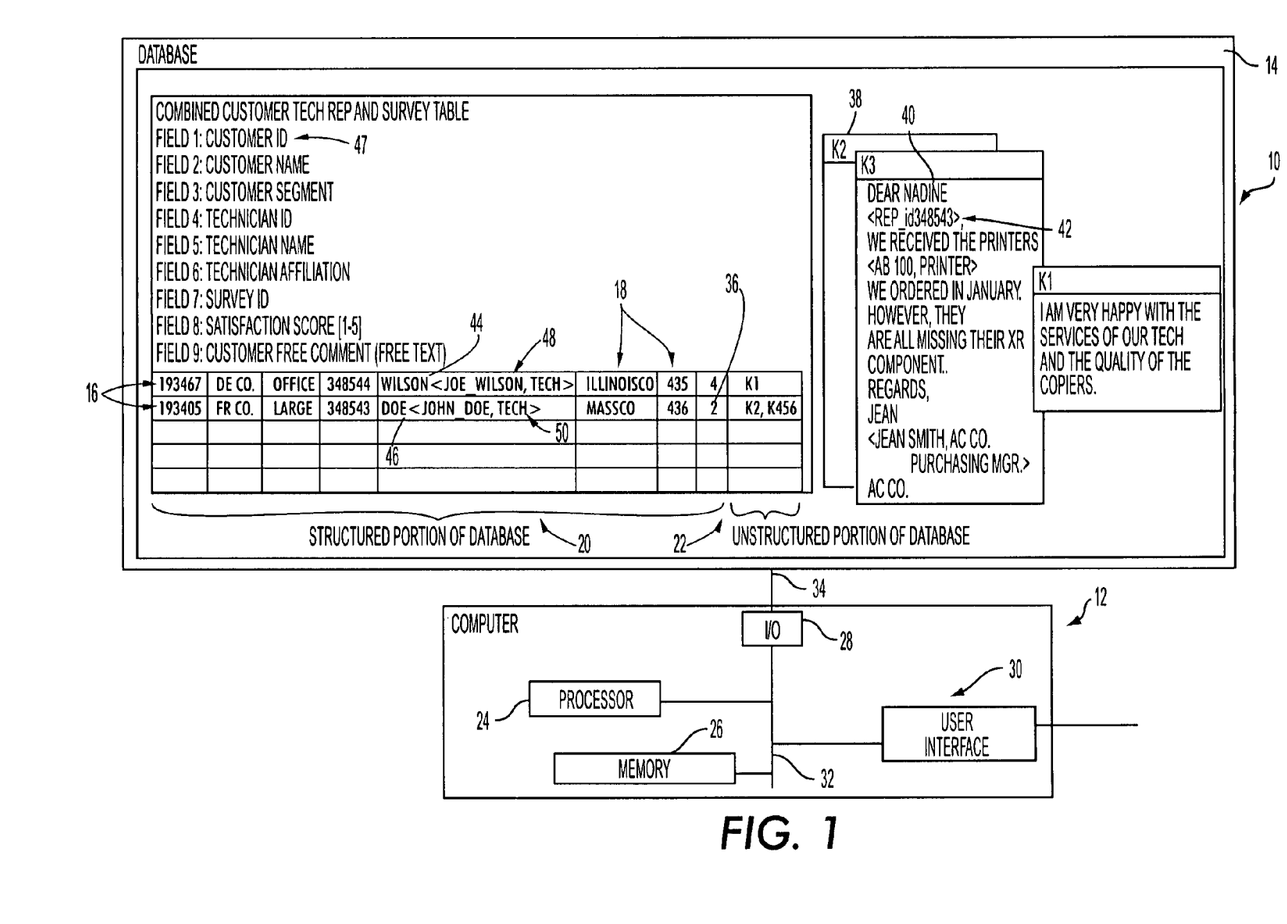
FIG. 1 is a functional block diagram of a system for searching a database comprising structured and unstructured (textual) documents.

The illustrated computer system 12 includes a processor 24, which controls the overall operation of the computer system 12 by execution of processing instructions which are stored in memory 26 connected to the processor 24. Computer system 12 also includes a network interface 28 and a user input output interface 30. The I/O interface 30 may communicate with one or more of a display, for displaying information to users, and a user input device, such as a keyboard or touch or writable screen, for inputting text, and/or a cursor control device, such as mouse, trackball, or the like, for communicating user input information and command selections to the processor 24. The various components of the computer system 10 may be all connected by a bus 32. The processor 24 executes instructions for performing analysis of the contents of the database, such as retrieving text from the database which is responsive to a query. The computer system 12 may be a PC, such as a desktop, a laptop, palmtop computer, portable digital assistant (PDA), cellular telephone, pager, or other communication system capable of searching the database.

The memory 26 may represent any type of computer readable medium such as random access memory (RAM), read only memory (ROM), magnetic disk or tape, optical disk, flash memory, or holographic memory. In one embodiment, the memory 26 comprises a combination of random access memory and read only memory. In some embodiments, the processor 24 and memory 26 may be combined in a single chip. The network interface 28 allows the computer to communicate with other devices via a computer network, such as a local area network (LAN) or wide area network (WAN), or the internet, and may comprise a modulator/demodulator (MODEM).

In the illustrated embodiment, database 14 may be stored in memory, such as on a server associated with a network 34 to which the computer system 12 is linked. Alternatively, the database 14 may be accessed from another network and/or server, e.g., via the internet.

In another embodiment, database 14 is stored in memory 26 or on a magnetic disk or tape, flash drive or other computer readable medium accessed by the computer system 12. While database 14 is shown as a single entity, it is to be appreciated that the database may be distributed with the component structured and unstructured parts 20, 22 being physically remote from each other in two or more different locations.

As will be appreciated, FIG. 1 is a high level functional block diagram of only a portion of the components which are incorporated into a computer system 12. Since the configuration and operation of programmable computers are well known, they will not be described further.

As shown in FIG. 1, the unstructured, text portion 22 of the database may be stored (either directly or via links) in one or a plurality of fields 18. In the illustrated embodiment, the last field includes links 36 (numbered in the illustrated embodiment K1, K2, etc) to the unstructured information 38, which may be contained in a separate table or linked to the documents which include the information themselves. The unstructured information is enriched with information 42 (e.g., with XML tags as illustrated). For example, a referring entity 40, Nadine, has been enriched with a normalized form of a business object—her representative ID Number.

Similarly, the structured portion 20 of the database 14 has also been enriched with information. In particular, referents in the individual cell entries 44, 46 of column fields 18 (and optionally also field names 47, field descriptions, and the like) have been enriched with normalized forms of the business objects to which they refer as XML tags 48, 50.

The database may be mined with analytical tools which allow retrieval of relevant data (such as tables and free text records, or portions there on by searching the tags 42, 48, 50 (or other form of enrichment) in addition to searching the rest of the database content. For example a query such as "Rep_Id348543 and Doe" may retrieve information from the second record 16 in the case of the database of FIG. 1. Other forms of exploitation of the enriched database are also contemplated. For example, classical text mining applications, such as retrieval, clustering, and categorization, are now possible. These classical data mining tools may be applied to the union of the structured and "restructured" unstructured portions of the database.

Figure 2:
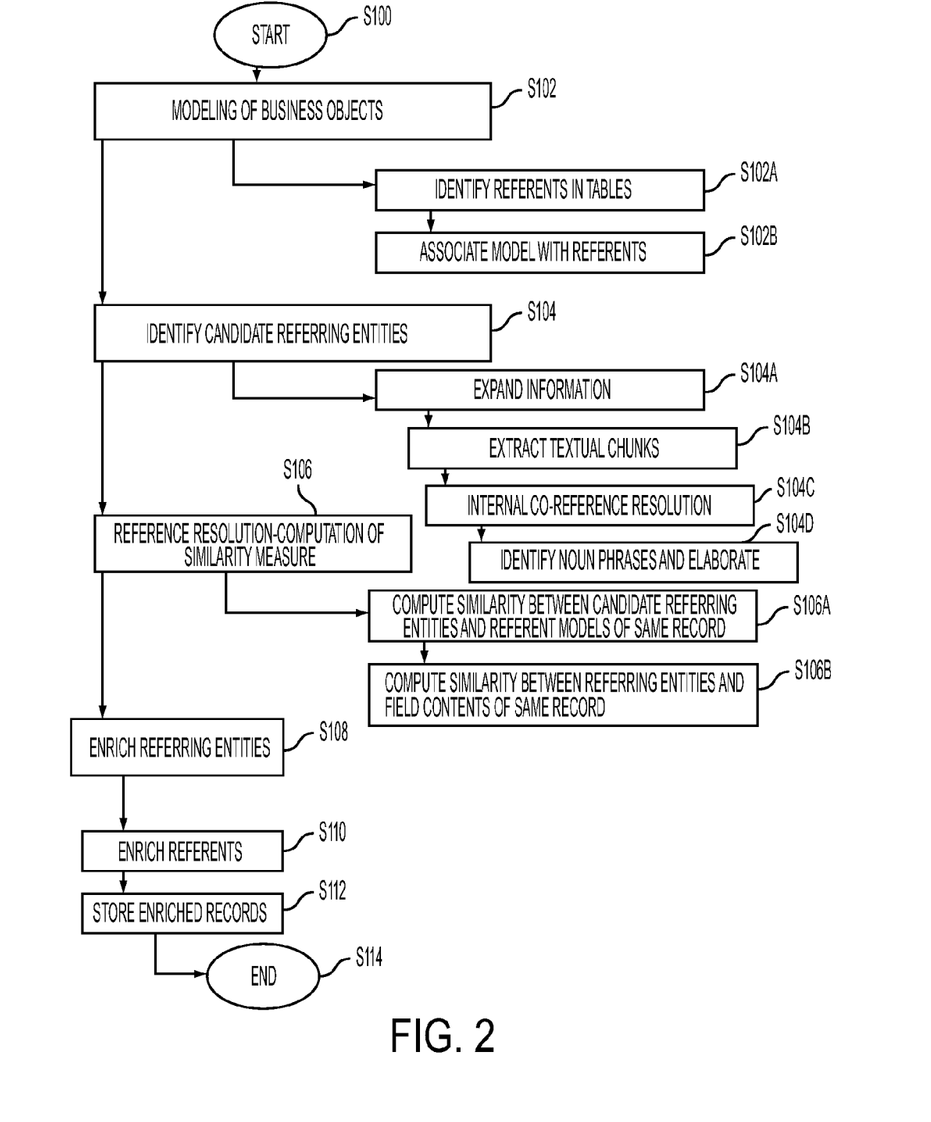
FIG. 2 is a flow diagram of an exemplary method of aligning unstructured and structured data.

With reference now to FIG. 2, a method of developing a database 14 as illustrated in FIG. 1 is shown in simplified form. It is to be appreciated that the method may include fewer or additional steps and that the steps need not be performed in the order illustrated. The method assumes that the unstructured data is already linked to the records to which it pertains. This step may be performed manually, for example, by incorporating links in the table(s).

Figure 3:
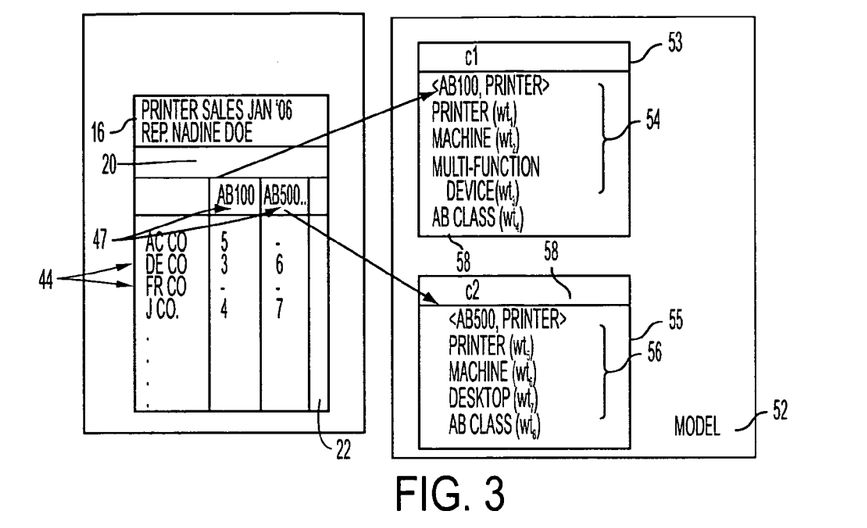
FIG. 3 illustrates an exemplary business model for a structured portion of a database.

The method begins at step S100. At Step S102, a set of business objects is identified. This stage may be performed in an off-line modeling stage, either manually or in a semi-automated way. The step may establish a very simple ontology of the business objects (or concepts) of interest. For example, field names 47 of one or more tables in the structured part 20 (FIG. 1) of the database (and/or cell entries 44, 46) may be identified and used to generate such a set of business objects. The set of business objects may be expanded, for example, as new customers, sales representatives and service engineers, and products, are added. FIG. 3, by way of example, illustrates a simplified model 52, in which column headings (field names) 47 of columns (fields) $c_1$ and $c_2$ of a table in the structured portion 20 of the database are modeled as referent models 53, 55 comprising sets 54, 56 of designating terms 58. In general, the model 52 includes a plurality of such sets 54, 56, such as at least ten or at least fifty sets of designating terms. Although a given set may include as few as one designating term 58, in general, each set includes a plurality of terms, such as from about two to about ten terms, although more than ten terms may be employed. As will be appreciated, while the system is described with respect to a single business model 52 which incorporates all the referent models 53, 55, etc., there may be more than one business model.

Figure 4:
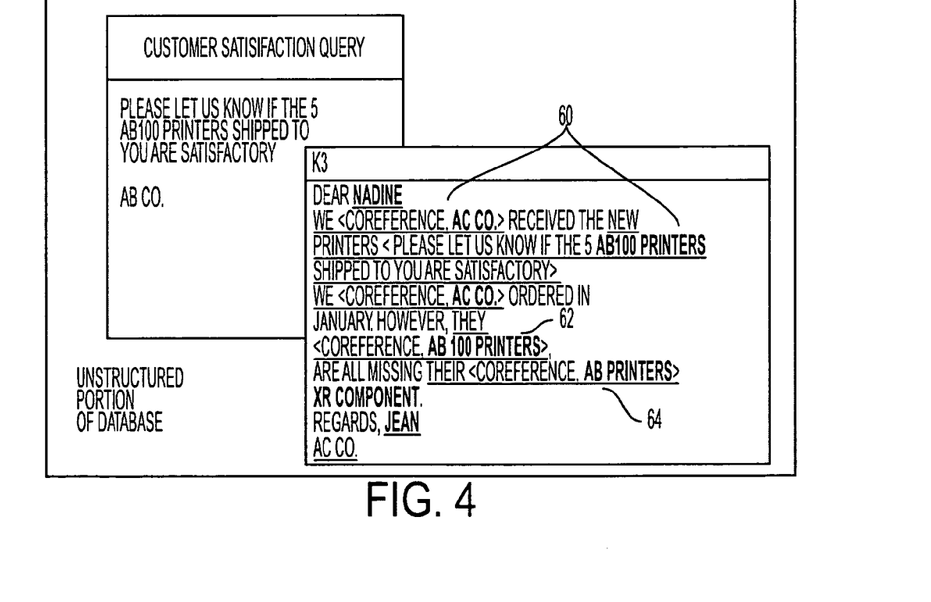
FIG. 4 illustrates expansion of an unstructured portion of a database.

At step S104, candidate referring entities are identified in one or a set of text entries in the unstructured part 22 of the database. In the referring entity detection phase, textual chunks are identified as candidate referring entities, i.e., referring entities which may refer to one or more of the business objects and, if determined to do so, will subsequently be enriched with information which links them to the referred business object. As new records are added to the database, this step may be repeated. By way of example, FIG. 4 illustrates a text entry K3 in the text portion 22 of the database in which candidate referring entities 60 are highlighted.

At step S106, a reference resolution step, similarity measures are computed between the candidate referring entities 60 identified at step S104 and the modeled business objects 54, 56 identified at step S102. The similarities may be computed at the abstract level (such as the role or function of the business object), or at the instantiated level (such as the name of a product, or of a person), or a combination of both. Based on the similarity computation, a textual chunk (candidate referring entity 60) may be determined to refer to one or more of the business objects (or, in some cases, to no business objects). As noted above, each record contains or refers to only a limited number of business objects. Additionally, each textual entry may be associated with a single record or with a relatively limited number of records, via links. This provides a context for disambiguation. Specifically, similarity measures may be computed for the models of those business objects that are associated with the same record of the table as the textual entry in which the candidate referring entities are found rather than for all business objects. In this way, the similarity measure for a candidate referring entity includes a computation of similarity with only a subset of the entire collection of modeled business objects.

At step S108, the textual chunks 60 for which the computed similarity measure indicates that the textual chunk refers to a business object are enriched with information 42 which allows them to be linked to the business object(s) to which they refer. Depending on the desired level of information, this may include a single object ID, an XML-tag or a textual expansion.

At step S110, the referents 44, 46 may be enriched with information, such as tags 48, 50 comprising the normalized form of the corresponding business object.

At step S112, the enriched records are stored in the database. The method ends at step S114.

Exemplary methods for performing each of these steps will now be described in further detail.

Offline Business Object Modeling

Step S102 (FIG. 2) creates a simplified ontology of the business objects of interest. An ontology is an organized set of terms. This may be achieved, at least in part, by exploiting the structure and optionally any metadata of the records 16 ($R_1$, $R_2$, etc.) in the structured portion 20 of the database. While in one embodiment, identification of business objects focuses on the abstract level of the object (e.g., roles or functions), rather than its particular entity name instantiations, in general, both the abstract level and entity name instantiations are considered. The ontology being built constitutes a business object model 52 (FIG. 3). In the model, each business object may be associated with at least one designating term, and generally a list of designating terms, describing the role or the function. The designating terms may be a single word or more generally, multi-words. More specifically, the business object model 52 includes, for each referent in a record in the structured database, an organized list of terms for the business object (or the business object to which the referent refers if the referent is not itself a business object) as well as the unique business object id.

More elaborated models may also be used, such as a weighted list, as long as they allow one similarity measure to be defined between textual chunks considered as referring entities and the business object (at the abstract level).

A first step in this process (Step S102A) may include the selection of the tables and the subset of the fields 18 of the structured portion 20 of the database which could be potential source of reference resolution, i.e., business objects. For example, in the table illustrated in FIG. 1, fields 1-6 may be selected. The following description focuses on field names 47 as the referents, although it is to be appreciated that other information may also be considered, such as cell entries 44, 46 and/or field descriptions. The fields can be considered as the structured representation of the business objects (referents). Once the columns ($c_1$, $c_2$, etc) are chosen, a referent model 53, 55 (FIG. 3) may be associated with each field 18 or cell entry 44 (step S102B). This step can be performed manually, automatically, or semi-automatically. The referent model 53, 55 may be, for example, a list of designating terms 54, 56, an ordered list of designating terms, or a weighted list of designating terms ($wt_1$, $wt_2$, etc. representing the weights in FIG. 3). The weighting may reflect the degree to which the designating term is associated the business object. Designating terms which most accurately describe the business object may be given a higher weighting.

The designating term may be the field name 47, either as displayed or incorporated into the table metadata as a field description. When field names are codes, abbreviations, and/or are not self-explanatory, the designating term may be the corresponding full term. Human intervention may guide this initialization process, particularly in the case of codes, abbreviations, and fields which are not self-explanatory. For example, starting from the field name 47 of a column $c_i$, a few designating terms may be added manually to its model $M(c_i)$. A lexicon, such as a thesaurus and/or other resources similar to WordNet, may then be used to expand the model, by considering, for example, one or more of synonyms, hyponyms, hypernyms, meronyms, and holonyms of the terms already contained in the model $M(c_i)$. Semantic enrichment of the model may also be based on statistical contextual co-occurrence analysis, if an appropriate comparable corpus is available. The result may be a set 54, 56 of designating terms (possibly weighted, e.g., by the degree of association with the initial business object), a vectorial representation of the business object, or a more complex representation. For example, a field name: "printer", may be expanded with the business object id: <AB 100, printer>, as well as with one of the following hypernyms: printer, copier, multifunction device, depending on what type of device it is. It may also be expanded with meronyms, such as the product names of its components, such as XR fuser, MB-X processor, F100 paper tray. Synonyms, such as names used in product literature for the AB100 printer, may also be included in the model 52. Information in the fields (e.g., cell entries 44, 46) may also be expanded in this way.

This process may be repeated for each of the selected field names 47 in the structured portion 20 of the database. At the end of this stage, a family of referent models 53, 55 has been created, each related to a business object having a referent within the database.

Referring Entity Detection

Various methods may be employed in identifying the referring entities 60 in the fields of textual portion 22 of the database which may depend, in part, on the type of text entries in the textual portion of the database.

A first step (S104A) may include expansion of certain sentences in the textual entries. It is often the case that the text entries in the textual parts are verbatim answers to implicit questions which can be identified from the corresponding survey question. Thus, the answer may be expanded with information from the question. For example, the question may include the name of the product or person, which can be used to enrich the text field. Thus, an expansion of the textual part may be performed by a simple concatenation and/or a question reformulation. For example, a question may be converted from interrogative to affirmative, followed by a concatenation.

A second step (S104B) in the identification may include the extraction of textual chunks in the text entries (as expanded by step S104A) as candidate referring entities. A parser may be used in extraction of the textual chunks from the text entries. Suitable parsers are disclosed, for example, in U.S. Patent Publication Nos. 20050138556 and 20030074187 and in Ait-Mokhtar, et al., "Incremental Finite-State Parsing," Proceedings of Applied Natural Language Processing, Washington, April 1997; and Ait-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997, the disclosures of which are incorporated herein in their entireties, by reference. Parsers typically perform several steps which are well known, including identifying words in the text (tokenizing), associating the words with their morphological form(s) (adjective, noun, verb, etc), and identifying phrases, such as noun phrases, adjectival phrases, and the like. The parser may also extract named entities by reference to a lexicon at a later stage. Various forms of expansion may be employed, such as the identification of semantic equivalents synonymy, hypernymy/hyponymy, and holonymy/meronymy described above.

Additionally, at Step S104C, standard techniques of intra-document, co-reference resolution may be employed. This step is performed to resolve as much reference as possible, in particular, by resolving pronominal anaphora and cataphora within a text entry. Co-reference uses semantic analysis to extract a noun associated with a pronoun, for example, by reference to the immediately preceding or following noun which fits the pronoun. The noun may be found in the same or in a closely located sentence. For example, the parser may include a co-reference module which can detect that "they" in the exemplary e-mail shown in FIG. 3 refers to "the printers" in the text entry. In this case, of the pronoun they is tagged with a pronominal cataphora link 62 to the noun printers (and by expansion, to the link to AB100 printers). In a similar way the pronoun their is tagged with a pronominal anaphora link 64, in this case also to the noun printers.

After these optional expansion and co-reference resolution steps, at step S104D, textual chunks having potential external references may be identified. This may be referred to as entity extraction. One element of this step is to try to eliminate either trivial (e.g., function words) or non-relevant parts of the text, in order to increase the efficiency of subsequent steps by reducing the search space. In one embodiment, only noun phrases (NP) are considered as candidate referring entities. Noun phrases, as used herein, includes phrases comprising at least one noun and any associated adjectives which describe the noun. Where there are no associated adjectives, the noun phrase may simply comprise a single noun or nouns. Thus, in the exemplary e-mail K3, in FIG. 1, the following textual chunks could be considered: Nadine; new AB printers, We (pronominal cataphora link to AC Co.); January; their (pronominal cataphora link to AB printers); XR Component; Jean; AC Co.

In one embodiment, other phrases (such as verb phrases) are ignored. Accordingly, step S104D may include simple NP extraction. The content of the textual record is now reduced to an ordered list of noun phrases which may be temporarily stored in memory. In order to make the reference resolution step easier and more robust, a normalized (e.g., lemmatized) form of the NP may additionally or alternatively be stored. NP extractors often need to do some morphological analysis and part-of-speech tagging before being able to recognize noun phrases, so this may not require any additional processing. Thus, the lemmatized NP new AB printer will additionally or alternatively be stored in the list.

Further noun phrases may identified by elaboration. For example, in the case of a person name, given the NP "Nadine Doe," additional noun phrases identified may include "N. Doe," "Doe, Nadine," "Doe," and the like.

It can be assumed that the identified NPs actually correspond to one of the following cases:
   (a) The NP does not refer to any business object of interest;
   (b) The NP is an entity name (person name, product name, etc.) referring to a particular instantiation of a business object, whose normalized form is in some field of the same record or other records of linked tables; for example, the role or function can be the column (field) name or, more precisely, the model associated to this column;
   (c) The NP is not an entity name, but an expression based on a common noun (often in a definite form), related to a role or a function and which is expected to be very similar to the representation of a business object (abstract level) as expanded by its model.

At the end of this step, for each textual field of each record of the considered table a list of (possibly normalized or lemmatized) candidate referring entities has been obtained in the form of a sequence of identified NPs.

Reference Resolution

This step (step S106) attempts to match, for each textual field in the text portion 22 of the database of each record $r_1$, $r_2$, the candidate referring entities with either the models of business objects, or (normalized) instantiations of these objects, limiting the scope to the instantiations (values) of relevant columns of the structured part of the database for the same record (or, possibly, with related records for linked tables). It will be appreciated that a record automatically gives context for delimiting the scope of disambiguation. Indeed, one record deals with a known, fixed set of business objects. As shown in FIG. 2, step S106 includes computing similarity between candidate referring entities and referent models of the same record (S106A) and computing similarity between referring entities and field contents of the same record (S106B).

More precisely, let L={$NP_1$, $NP_2$, ... $NP_n$} be the list of candidate referring entities $NP_j$ for the current textual field of a record r. Let M={$M_1$, $M_2$, ... $M_n$} be the list of business objects $M_i$ (at the abstract level—i.e., roles, functions), included in their model $M(c_i)$. Each business object $M_i$ (or more strictly, its abstract instantiation) in the model $M(c_i)$, is associated with a column index $c_i$, referring to the structured part of the database. $NP_j$ is compared with $M_i$ (Step S106A). $NP_j$ is also compared with val(r, $c_i$), i.e., the content of the field $c_i$ for the record r (or the content of a related field of another linked table if, for example, the initial $c_i$ cell entry is an ID number) (Step S106B). Thus, for example, in the table illustrated in FIG. 1, the NP "tech" (or its enriched form) from text entry K1, is compared with the content of field 5 for the same record, i.e., "Wilson" and with the model $Mc_5$, which may include the function "tech" as one of its designated terms.

The comparison may be performed using a similarity measure, such as the cosine similarity measure, string kernel, or more general kernels, as in the minimum edit distance. The minimum edit distance, or Levenstein distance, computes a measure of the number of insertions, substitutions and deletions required to transform one string of characters (e.g., letters, numbers and spaces), such as $NP_j$ into another string, here $M_i$. String kernels provide the ability to recognize similarities among character strings even when the characters are not in a perfect sequence. A further discussion of string kernels is provided by Lodhi, et al., "Text Classification Using the String Kernel," in Advances in Neural Information Processing Systems 13 (MIT Press, 2001) and in Cancedda, et al. "Word-Sequence Kernels," Journal of Machine Learning Research, 3: pp. 1059-1082 (February 2003).

The definition of the similarity measure can be any suitable measure from a simple string matching test, to more robust content similarity measures. In one embodiment, by way of example, a referent is associated in model $M(c_i)$ with a weighted list of designating terms (words or multi-word expressions and the similarity measures computed as follows:

sim($NP_j$, $M(c_i)$) is equal to the maximal weight of the designated terms of $M(c_i)$ which are at a relative edit-distance of at least x % from NPj, where x % may be for example, 70%, 80%, or 90%.

sim($NP_j$, val(r, $c_i$)) tends to be a more complex similarity measure since val(r, $c_i$) is often a sequence of proper nouns and $NP_j$, when referring to the sequence of proper nouns, may use only a part of the sequence (e.g., the first name of the person's name).

The relative edit distance, for computing sim($NP_j$, $M(c_i)$), may be determined by first computing a classical edit distance between two strings (specifically, the minimum number of substitutions, deletions, and so forth for converting $NP_j$ to a designated term of $M(c_i)$). The classical edit distance is then divided by the average length of the strings to be compared to derive the relative edit distance.

The following algorithm may be used to solve the external reference problem described above:

```
For r=1...number of records;
    For f=1 ... number of textual fields;
        For j=1 ... number of candidate referring NP in field f of record r;
            Maxsim=0;
            For m=1...number of business concepts;
                Compute s=sim($a_{rfj}$,$M_m$); note $a_{rfj}$ is the $NP_j$ of field f from record r and $M_m$ is the model associated with concept m;
                If s>Maxsim: { Maxsim=s; bus_obj= m ; refer_to = role};
                Compute s=sim($a_{rfj}$,val(r,$c_m$)); note val(r,$c_m$) is the value of the cell content (cell row r and column $c_m$);
                If s>Maxsim: { Maxsim=s; bus_obj = m ; refer_to = name};
            Endfor m
            If Maxsim>threshold:
                Link $a_{rfj}$ with <bus_obj($a_{rfj}$), refer_to($a_{rfj}$)>;
            ElseLeave $a_{rfj}$ alone (i.e., decide that this NP does not refer to a business object);
            End
        Endfor j
```

-continued

Endfor f
Endfor r

At the end of this step, we have a set of links between referring entities $a_{rfj}$ and business objects $bus\_obj(a_{rfj})$. The referring entity is either designated as referring to the role/function or the name of the object itself. This is indicated by an associated $refer\_to(a_{rfj})$ value. This value can be ether a "name" or a "role."

Enrichment

This step is a relatively simple one, once the reference resolution has been performed. It includes enriching the textual fields of the database (step S108) by including information that can be derived from the business objects bus_obj $(a_{rfj})$ which have been linked to referring entity $a_{rfj}$ in the previous step (S106). For example, let c be the column associated with $bus\_obj(a_{rfj})$. Then, the referring entity is tagged or otherwise enriched with $<val(R,c), bus\_obj(a_{rfj})>$ as extra information in a manner suited to the subsequent use of the enriched database. In general, val(R,c) may be the normalized way to designate the instantiated business object and be a unique identifier (i.e., the business object name), while $bus\_obj(a_{rfj})$ designates the role or the function. It should be noted that the enrichment may also include "normalization," the replacement of a textual chunk with a normalized (more canonical or standardized) form. The standardized form is generally given by the structured part of the database. Normalization helps in obtaining superior retrieval or analytics performance.

Another form of enrichment may include annotation of the textual portion with a reference to the field of the table with which a match was found.

In one embodiment, the text portion 22 of the database is further enriched with additional information if, for example, the business object is also referred to in another linked table. For example, where val(R,c) is nothing else than an ID number acting as foreign key and being the primary key of a more useful, more descriptive table.

As already mentioned, how this enrichment is organized may depend on further processing and indexing mechanisms. XML-tags located just after the NP are one solution, but it is also contemplated that generated natural language textual chunks may be inserted around or in place of the NP. This natural language description could be derived from the concept descriptions in some standard way, with some fields to be filled with instantiated values.

The following non-limiting example illustrates the development of a database which enables a text portion, comprising responses to customer satisfaction questionnaires, to be incorporated with structured data which includes tables of customer information.

EXAMPLE

In this example, structured data which includes customer information and information about products is stored in a database. As unstructured data to be enriched are customer responses to general satisfaction questionnaires which are in the form of e-mails, OCR-ed correspondence, or the like was employed. The architecture is implemented in Python, using MySQL as DBMS. In this example, four tables were used: two of the tables containing structured input data, the external information source to be used to find a solution for references (hereinafter Filler Data). Another table contained the textual data that was to be enriched (hereinafter Form Data). A fourth table, generated in the method, is a replicata of the Form Data where the textual data contain enrichments.

The Form Data in the third record was preprocessed in the sense that it contained not raw text but chunks containing Part of Speech tagged (POStagged) words (i.e., words already tagged with their grammatical function, such as noun, pronoun, adjective, verb, etc).

Figure 5:
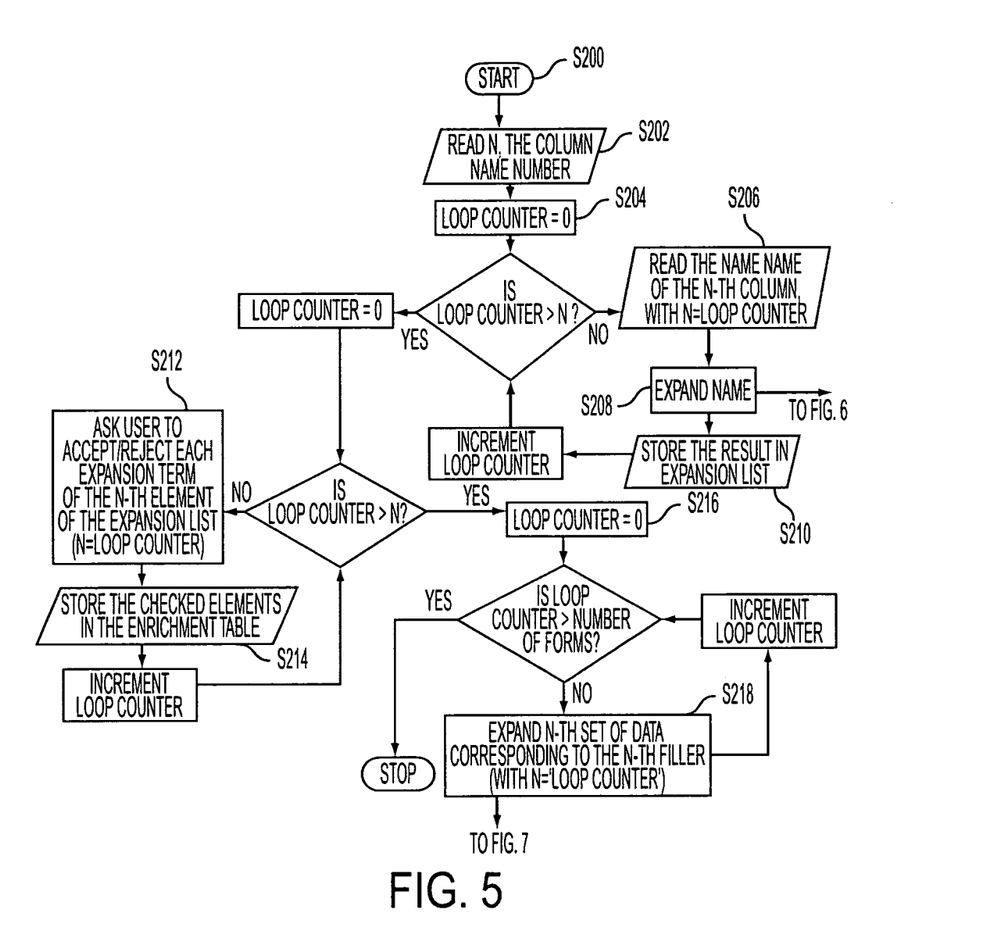
FIGS. 5 to 7 illustrate a flow diagram of an exemplary method of developing the business model of FIG. 2.

FIG. 5 shows steps in the steps in modeling business objects (corresponding to Step S102 of FIG. 2). The method starts at step S200. At step S202, the column number N of a table is read. A loop counter is set to 0 (step S204). As long as the loop counter is less than N, the name of the column is read (step S206). At step S208, the name is expanded (as for Step S102B). This step is shown in greater detail in FIG. 6, and is discussed below. At step S210, the results of the expansion are stored in an expansion list of designated terms. The loop counter is incremented and the steps S206-S210 repeated until all the columns in the table are processed. The method then proceeds to step S 212 where the operator of the system is asked to accept or reject the new designated terms added to the referent model stored in the expansion list. The user may chose to delete some of the designated terms. The remaining designated terms (elements) are stored in the enrichment (fourth) table (step S214). These steps are repeated until all the referent models have been reviewed by the user. Where more than one table has the same column description, a previously generated referent model can be used for the second and subsequent occurrences.

Once all the referent models have been stored in the enrichment table, the method proceeds to step S216, where a new loop counter counts the number of forms of Form Data. The Form data is then expanded as shown in FIG. 7 (corresponding to step S104), as described below.

Figure 6:
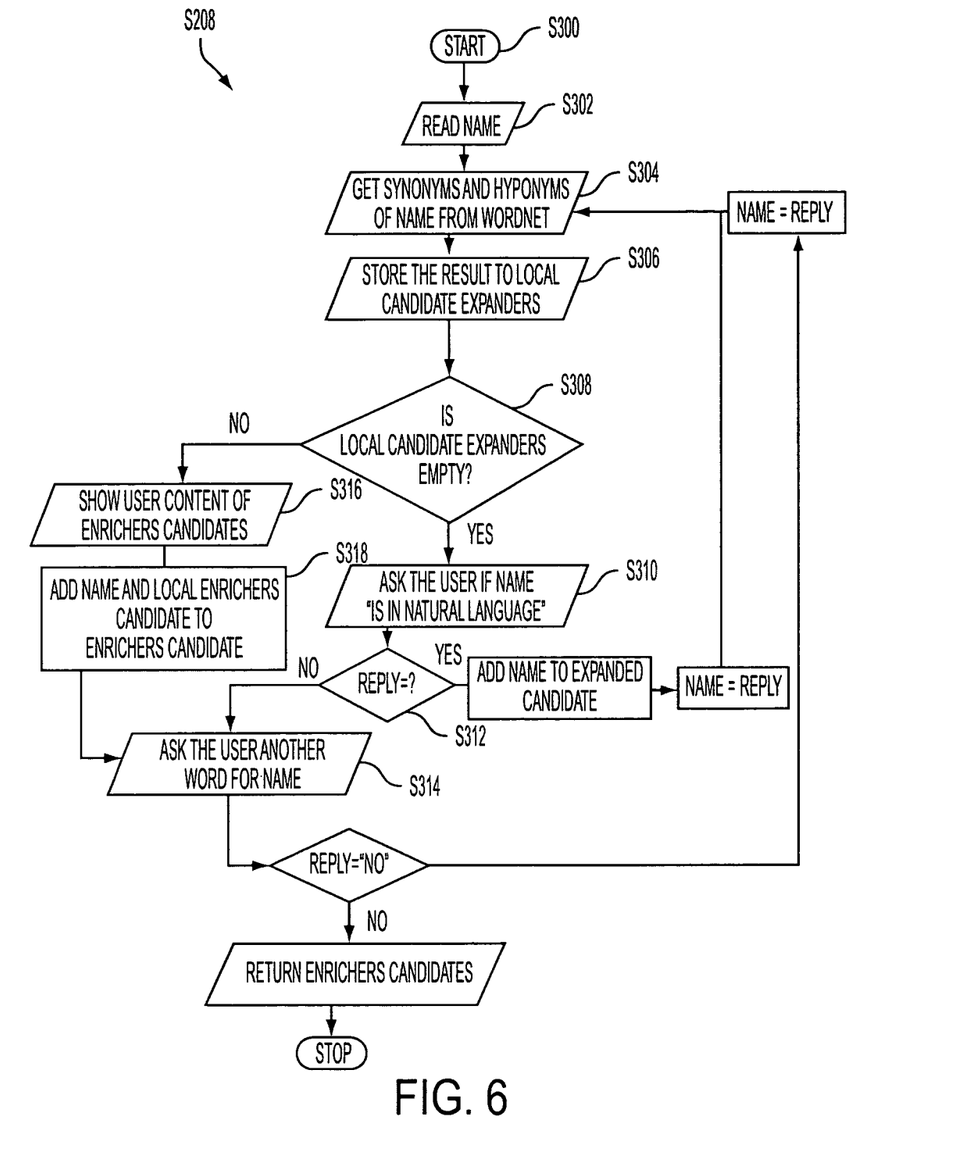

With reference to FIG. 6, the expansion step S208 begins at step S300 and proceeds to step S302, with reading the NAME (column description) of a column. At step S 304, synonyms and hyponyms of the NAME are retrieved from WordNet. The results are stored as a local candidate terms list (step S306). At step S308 the local candidate terms list is checked to see if it is empty (i.e., no terms have been retrieved from WordNet). If so, the user is asked if the NAME is in a natural language (step S310). The user may answer YES at step S312, and may provide additional terms known to the user, in which case the NAME (and any additional terms) are returned to step S304. If the user answers No at step S312, the method proceeds to step S314, where the user is asked for another word for the NAME. For example, the NAME may be an acronym or abbreviation and the user enters the full term. The method returns to step S304 to process the user-added term(s). If at step S308, the local candidate list contains one or more terms, the list may be shown to the user at step S316. The NAME itself is added to the local candidate list (S318). The NAME and any new local candidates are stored in the Expansion list (step S210, FIG. 5).

Figure 7:
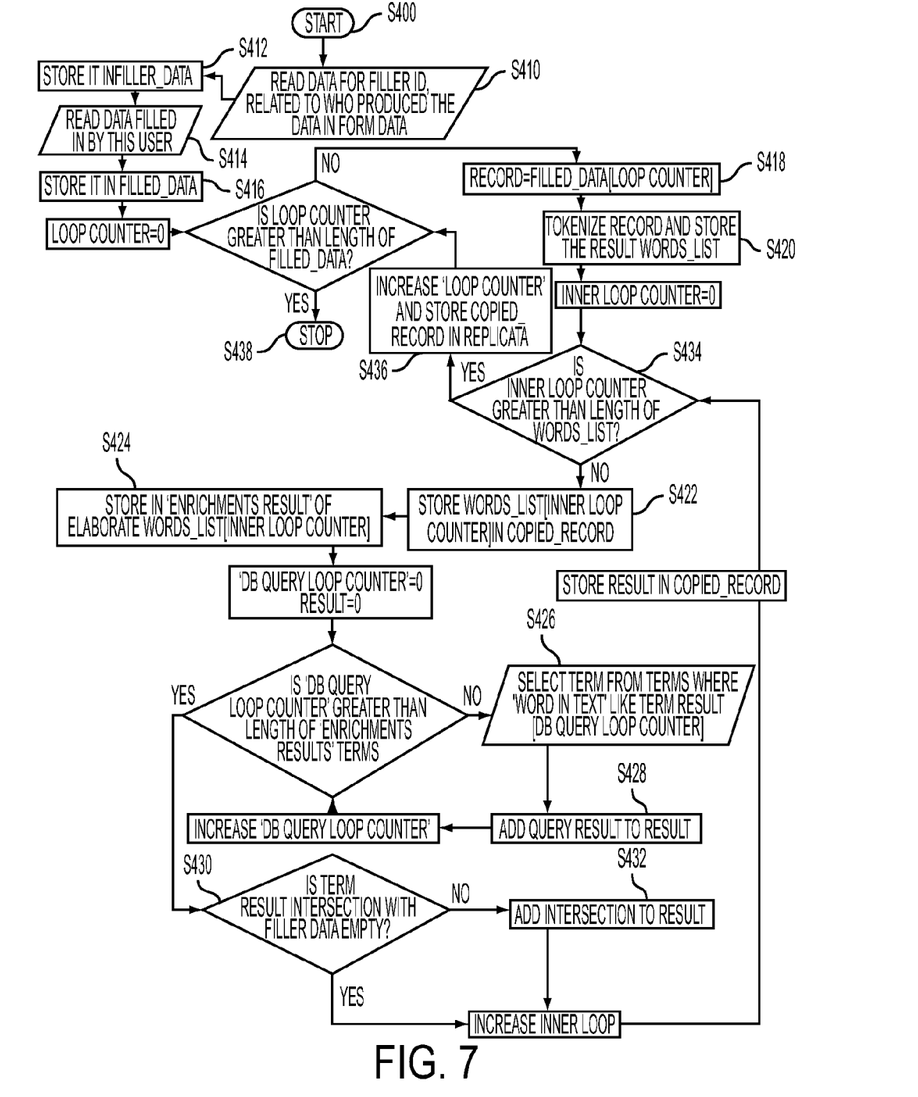

With reference to FIG. 7, the expansion of the Filler data (step S116) begins at step S400. At step S410, the Filler data is read to determine who (i.e., which customer) produced the Filler data in Form data. The Form data will become the unstructured part of the database. In order to insert it into the database, the specific record to which it pertains is thus identified in this step. At step S412, the information is stored in the filled data. At step S414, the data filled in by this customer is read and stored in the Filler data (S416). Specifically, the data filled in by the customer is read and the raw text from the form is extracted. This is then stored in the database in the appropriate field as unstructured data. A loop counter is used to sequentially review a text string in the Filler data (S418), tokenize it (S420) and store the NP results in a words list (S422). More complex expansion was not performed for this example.

In the present example, the chunks are POStagged as input. In step S424, the POStags may be removed. The words list may be elaborated to generate possible permutations of the identified Noun Phrases (step S424). All possible permutations of the words in a chunk (in the case of chunks containing proper nouns only) may be generated. Additionally, strings comprising sub chunks of a chunk may be built by removing all possible combinations of adjectives form the initial chunk. Using a loop counter to sequentially examine all of the words in the elaborated words list, at step S426, a word is compared with terms in the FORM data. If a match is found, the result is added to a RESULT list (step S428) (For simplicity, the similarity function was a simple yes/no matching). If there is no match found with any of the terms (step S430), this information is also noted, otherwise, at S432, the intersection is added to result. The next words list is considered (step S434). Once all words are considered, a copy of the form, together with enriched information corresponding to the matches is stored in the replicata of the form (step S436). The method ends at step S438.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for enrichment of text comprising:
   providing a database in which defined hierarchical relationships exist between different parts of the data, the database having a structured part and an unstructured part, the database including a set of fields and a set of records, each of the fields being distinguished as comprising either structured data or unstructured data, the structured data fields having a predefined relationship to the structured data of each field, the structured part of the database including the structured data in structured data fields of records, and the unstructured part including unstructured data comprising textual data for unstructured data fields of the records, whereby some of records include both structured data in structured data fields and textual data for unstructured data fields;
   after providing the database, generating a model for the structured data in the structured data fields of the structured part of the database, the generating comprising associating referents in the database with designating terms which each describe a business object, the referents each comprising or referring to one of the business objects;
   identifying a plurality of candidate referring entities in the textual data of the unstructured data fields of the unstructured part of the provided database;
   for each candidate referring entity, computing a similarity measure which includes:
   comparing the candidate referring entity in the textual data with the model to identify referring entities of the candidate referring entities and corresponding objects to which the referring entities refer, and
   comparing the candidate referring entity in the textual data with the structured data of the same record; and
   based on the computed similarity measure, enriching the textual data for the unstructured data fields with information derived from the business objects for that record, the enrichment including annotating a free text entry in the database with information relating to a business object or referent.

2. The method of claim 1, wherein the business objects comprise physical or logical object of significance to a business.

3. The method of claim 1, wherein the referents comprise contents of fields for the structured data.

4. The method of claim 1, wherein the generation of the model includes for each of the referents, identifying designating terms which are in a semantic relationship with the referent.

5. The method of claim 4, wherein the identification of designating terms which are in a semantic relationship with the referent comprises accessing a lexical resource.

6. The method of claim 1, wherein one of the designating terms associated with each of the referents comprises a normalized unique identifier of the object.

7. The method of claim 1, wherein the identifying of candidate referring entities in the textual data comprises identifying noun phrases.

8. The method of claim 1, wherein the identifying of candidate referring entities comprises identifying a normalized form of the candidate referring entity.

9. The method of claim 1, wherein the identifying of candidate referring entities comprises at least one of:
   expanding the textual data with external information relating to the textual data; and
   co-reference resolution within the textual data or expanded textual data.

10. The method of claim 1, wherein the associating of designating terms with the referents comprises, for each referent, associating a plurality of designating terms with the referent, each of the designating terms having a weight.

11. The method of claim 10, wherein the computing of the similarity measure comprises computing the similarity measure between a candidate referring entity and a referent as a function of the weight of each of the designating terms.

12. The method of claim 1, wherein the computing of the similarity measure comprises computing at least one of a string kernel value and a minimum edit distance between a candidate referring entity and a designating term of the model.

13. The method of claim 1, wherein the comparing of the candidate referring entity in the textual data with structured data of the same record of a table or with structured data of another record linked to that record.

14. The method of claim 1, wherein the enrichment comprises enriching the textual data with a normalized identifier of the business object to which the identified referent refers.

15. The method of claim 14, wherein the candidate referring entity in the textual data is enriched with a normalized identifier of the business object, which comprises at least one of:
   a name of a person, product, or service, and
   an associated role or function of the person, product, or service.

16. The method of claim 1, further comprising enriching the structured data with information derived from the object to which the referent refers.

17. A system comprising:
   a database comprising records stored in memory which include structured data arranged in records comprising fields of structured data and textual data in fields of textual data, the textual data comprising annotations which identify business objects referred to by the structured data, developed by the method of claim 1; and a processor which executes instructions in memory for querying the database to analyze text from the textual data and structured data.

18. A method of retrieving text responsive to a query comprising:

inputting a query;

retrieving information responsive to the query from stored structured and textual data, the textual data having been enriched according to the method of claim 1.

19. The method of claim 1, wherein each of the records includes both a structured part and an unstructured part.

20. The method of claim 1, wherein the referents comprise field names for the structured data fields.

21. The method of claim 1, wherein the database comprises a table in the form of cells, each of a plurality of the records having structured data in structured data cells of a respective row of cells and unstructured data in or linked to an unstructured data cell in the row of cells, each field comprising a column of cells which includes cells of the plurality of rows.

22. A system for enrichment of text comprising:

a database in which defined hierarchical relationships exist between different parts of the data, the database having a structured part and an unstructured part, the database including a set of fields and a set of records, each of the fields being distinguished as comprising either structured data or unstructured data, the structured data fields having a predefined relationship to the structured data of each field, the structured part of the database including the structured data in structured data fields of records, and the unstructured part including unstructured data comprising textual data for unstructured data fields of the records, whereby some of records include both structured data in structured data fields and textual data for unstructured data fields;

a model for structured data in structured data fields of the structured part of the database, the model associating referents in the database with designating terms which each describe a business object, the referents each comprising or referring to one of the business objects, the model having been generated after providing the database; and a processor which:

identifies a plurality of candidate referring entities in the textual data of the unstructured data fields of the unstructured part of the database, for each candidate referring entity, computes a similarity measure which includes:

comparing the candidate referring entity in the textual data with the model to identify referring entities of the candidate referring entities and corresponding objects to which the referring entities refer, and comparing the candidate referring entity in the textual data with the structured data of the same record; and based on the computed similarity measure, enriches the textual data for the unstructured data fields with information derived from the business objects for that record, the enrichment including annotating a free text entry in the database with information relating to a business object or referent.

* * * * *